Patented Jan. 25, 1938

2,106,558

UNITED STATES PATENT OFFICE 2,106,558

XANTHATES OF RESIN ALCOHOLS AND METHOD FOR THEIR PRODUCTION

Philip A. Ray, Wilmington, Del., assignor to Hercules Powder Company, Wilmington, Del., a corporation of Delaware No Drawing. Application May 14, 1935, Serial No. 21,483

18 Claims. (Cl. 260—99.11)

This invention relates to xanthates of resin alcohols and method for their production.

Heretofore it has been known to produce a xanthate of a lower alcohol, as ethyl, amyl, etc. by treatment of the alcohol with an alkali metal in an inert solvent for the formation of an alcoholate and then reacting the alcoholate with carbon disulphide for the formation of the xanthate.

Now in accordance with this invention, contrary to what would be expected from the state of the prior art, it has been found that xanthates of resin alcohols, such as an alcohol derived from abietic acid, pimaric acid, etc., and having an entirely different structure from that of the lower alcohols, can be produced by treatment with an alkali metal, as, for example, sodium, potassium, etc., in an inert solvent, as, for example, heptane, toluene, etc., for the formation of an alcoholate and reacting on the alcoholate with carbon disulphide for the production of a xanthate.

More specifically, for the production of xanthates of resin alcohols embodying this invention, by the method in accordance therewith, a resin alcohol as such, or a resin alcohol which has been hydrogenated to any degree, may be used. In general, the alkali metal and the resin alcohol or hydrogenated resin alcohol will be refluxed, with or without a solvent, non-reactive toward the alkali metal for the formation of an alcoholate and after the separation of any unreacted alkali metal from the reaction mass, the xanthate will be formed by addition of carbon disulphide to the reaction mass. The xanthate will be finally recovered from the reaction mass by precipitation caused by the addition of a precipitant, as for example, toluene, petroleum ether and filtering. In most cases it is necessary to add a minimum amount of solvent for the xanthate, as for example, chloroform, acetone, etc. before precipitation, because the xanthate is not completely soluble in the quantities of solvent, as heptane, used in the reaction. The xanthate may be brought to substantially 100% purity by reprecipitation.

The xanthates of resin alcohols in accordance with this invention will be found to be of use and advantage variously in the commercial arts and more particularly, will be found to be valuable for use as wetting out agents in textile baths and for use as collectors in the flotation of ores.

As illustrative of practical adaptation of this invention for the production, for example, of sodium hydroabietyl xanthate, for example, about 17 grams of hydrogenated abietyl alcohol and about 1.2 grams of metallic sodium are refluxed with about 55 cc. of heptane for 15 hours, in any suitable form of apparatus. Any unreacted sodium is then separated from the reaction mass by any convenient or desired procedure and about 3.7 grams of carbon disulphide is stirred into the mass. The xanthate will form almost immediately on addition of the carbon disulphide. The xanthate having been formed, the mass, including the solvent, as heptane, is dissolved in a minor amount of chloroform, acetone, or other suitable solvent and the xanthate precipitated from the solution by adding thereto a precipitant as, for example, petroleum ether.

The product recovered will amount to about 8 grams of sodium hydroabietyl xanthate representing a yield of about 49% of theoretical and will analyze 15.6% sulphur (theory 16.4% sulphur). The product may be made to give practically the theoretical content of sulphur (16.4%) by reprecipitation.

The procedure above generally outlined and as specifically illustrated may be followed for the production of xanthates with use of abietyl alcohol, alcohols derived from pimaric acid, etc., in place of hydrogenated abietyl alcohol, procedure with the use of which is more specifically illustrated in the above example.

Tests made with the use of xanthates in accordance with this invention have shown that they possess great value as collectors and wetting-out agents. Thus, using sodium abietyl xanthate as a collector, a recovery of concentrates amounting to 86–87% was obtained on treatment of a zinc ore containing 2.65% zinc, as zinc sulphide. Such may be compared with a recovery of concentrates from the same ore amounting to 87% using "aerofloat" a commonly used collector on such ore.

The value of the xanthates embodying this invention, as wetting out agents appears from tests made in comparison with "Gardinol", a well known wetting out agent, and which may be tabulated as follows:

| | Wetting out value—grams/liter |
|---|---|
| Sodium hydroabietyl xanthate | 1.9 |
| "Gardinol" (solid) | 1.3 |
| "Gardinol" (liquid) | 3.6 |

The xanthates are stable in sodium hydroxide and sodium chloride solution, but are generally not stable in acid solutions.

What I claim and desire to protect by Letters Patent is:

1. A xanthate of an alcohol produced by carboxylic reduction of a resin acid.

2. An abietyl xanthate.

3. A xanthate of an alcohol produced by carboxylic reduction of pimaric acid.

4. A xanthate of a hydrogenated alcohol produced by carboxylic reduction of a resin acid.

5. A hydrogenated abietyl xanthate.

6. A xanthate of a hydrogenated alcohol produced by carboxylic reduction of pimaric acid.

7. Sodium abietyl xanthate.

8. The method of producing a xanthate of a resin alcohol which includes forming an alkali alcoholate of an alcohol produced by carboxylic reduction of a resin acid and xanthating the alcoholate.

9. The method of producing a xanthate which includes heating an alcohol produced by carboxylic reduction of a resin acid with an alkali metal to form an alcoholate and xanthating the alcoholate.

10. The method of producing a xanthate which includes heating abietyl alcohol with an alkali metal to form an alcoholate and xanthating the alcoholate.

11. The method of producing a xanthate which includes heating an alcohol produced by carboxylic reduction of pimaric acid with an alkali metal to form an alcoholate and xanthating the alcoholate.

12. The method of producing a xanthate which includes refluxing an alcohol produced by carboxylic reduction of a resin acid in solution in an inert solvent with an alkali metal to form an alcoholate, xanthating the alcoholate, dissolving the reaction mass in a solvent therefor and precipitating the xanthate from the solution.

13. An alkali metal abietyl xanthate.

14. An alkalii metal hydroabietyl xanthate.

15. Sodium hydroabietyl xanthate.

16. Potassium abietyl xanthate.

17. The method of producing a xanthate which includes heating abietyl alcohol with sodium to form an alcoholate and xanthating the alcoholate.

18. The method of producing a xanthate which includes refluxing abietyl alcohol in solution in an inert solvent with an alkali metal to form an alcoholate, xanthating the alcoholate, dissolving the reaction mass in a solvent therefor and precipitating the xanthate from the solution.

PHILIP A. RAY.